United States Patent

Kazuro et al.

Patent Number: 5,799,754
Date of Patent: Sep. 1, 1998

[54] MARKING BRAKE LININGS

[75] Inventors: Jean M. Kazuro, Sarcelles; Jean-Pierre N. Caron, Cuts, both of France

[73] Assignee: Ferodo Abex SA, France

[21] Appl. No.: 776,249

[22] PCT Filed: Aug. 2, 1995

[86] PCT No.: PCT/GB95/01831

§ 371 Date: Jan. 24, 1997

§ 102(e) Date: Jan. 24, 1997

[87] PCT Pub. No.: WO96/05445

PCT Pub. Date: Feb. 22, 1996

[30] Foreign Application Priority Data

Aug. 8, 1994 [FR] France ................ 94 09800

[51] Int. Cl.$^6$ .................................... F16D 66/00
[52] U.S. Cl. .................... 188/1.11 W; 188/250 B
[58] Field of Search .............. 188/1.11 W, 1.11 WE, 188/73.1, 250 B, 250 D, 250 G, 264 G; 116/208

[56] References Cited

U.S. PATENT DOCUMENTS

| 3,533,491 | 10/1970 | Svenson | 188/1.11 W |
| 4,356,897 | 11/1982 | Urban | 188/1.11 W |
| 4,658,936 | 4/1987 | Moseley | 188/1.11 W |
| 5,228,541 | 7/1993 | Plude | 188/1.11 |
| 5,511,636 | 4/1996 | Tanaka | 188/1.11 |

FOREIGN PATENT DOCUMENTS

| 2441100 | 11/1978 | France. | |
| 2404150 | 5/1979 | France | 188/1.11 W |
| 2734786 | 2/1979 | Germany | 188/1.11 W |
| 1586200 | 3/1981 | United Kingdom | 188/1.11 W |

*Primary Examiner*—Robert J. Oberleitner
*Assistant Examiner*—Chris Schwartz
*Attorney, Agent, or Firm*—Nixon & Vanderhye

[57] ABSTRACT

The present invention relates to marking friction linings for drum brakes or for single-block brake pads in which the friction lining and the support member are made together by moulding a single material. According to the invention, the back of the friction lining or the back of the single-block brake pad is provided with an insert that is not oxidizable and that withstands a temperature of greater than 200° C., the insert having a surface that is visible outside the lining or the pad and that is suitable for acting as a medium to carry indelible information. Advantageously, the insert is in the form of a tongue, that projects towards the top of the brake calliper.

4 Claims, 2 Drawing Sheets

MARKING BRAKE LININGS

TECHNICAL FIELD

The present invention relates to indelibly marking brake linings for drum brakes or for disk brakes.

BACKGROUND

At present, friction linings for drum brakes are marked either by ink jet marking directly on the lining or on a colour background previously deposited on the lining, or by marking using a transfer, or else by indentation by pressing a punch against the lining, in which case if it is desired for the marking to be coloured, a colour deposit film may be placed between the punch and the brake lining.

Marking is performed either on the edge of the brake lining or else on its concave back face which is subsequently in contact with the brake lining support member in the caliper of the drum brake.

Such marking serves to identify a new friction lining, but it cannot guarantee that a friction lining will continue to be identifiable throughout its lifetime, and in particular it cannot guarantee that the origin of a used lining can be determined.

The present invention also relates to marking single-block brake pads which do not include a metal support member on which the friction lining is secured.

FR-A-2,441,100 relates to such a brake pad made by moulding a preform for the support member out of organic material and a preform for the brake lining, and in which a metal reinforcing member is incorporated in the support member. That document represents the state of the art closest to the present invention. However, in that document the function of the reinforcing member is to stiffen the support member which is made of organic material.

SUMMARY OF THE INVENTION

The object of the present invention is to provide a unique, unfalsifiable identification for a friction brake lining, or for a single-block brake pad, which identification lasts throughout the lifetime of the lining or pad, including after a possible accident.

According to the invention, this object is achieved by the fact that the friction lining includes, in an unused portion thereof, an insert that is not oxidisable and that withstands temperatures greater than 200° C., said insert having a surface that is visible from outside the pad and that is suitable for serving as a medium for carrying indelible information.

With a single-block brake pad, the insert is located in the rear portion of the pad which performs the support member or backplate function. The insert is then advantageously in the form of a tongue located on the back of the brake pad and projecting towards the top of the brake caliper. The tongue enables the pad to be extracted when worn out.

A particularly preferred insert material is stainless steel, although other materials such as brass may be used.

Other advantages and characteristics of the invention will be apparent from the following description given by way of example with reference to the accompanying drawings.

DETAILED DESCRIPTION OF THE DRAWINGS

Figure 1:
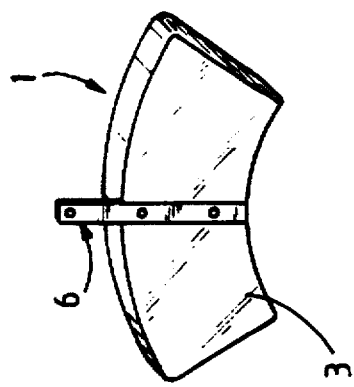
FIG. 1 is a perspective view of a single-block pad for a disk brake and fitted with an insert of the invention.
Figure 3:
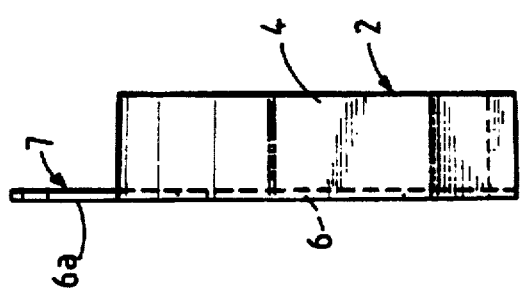
FIG. 3 is an end view of the FIG. 1 brake pad.
Figure 2:
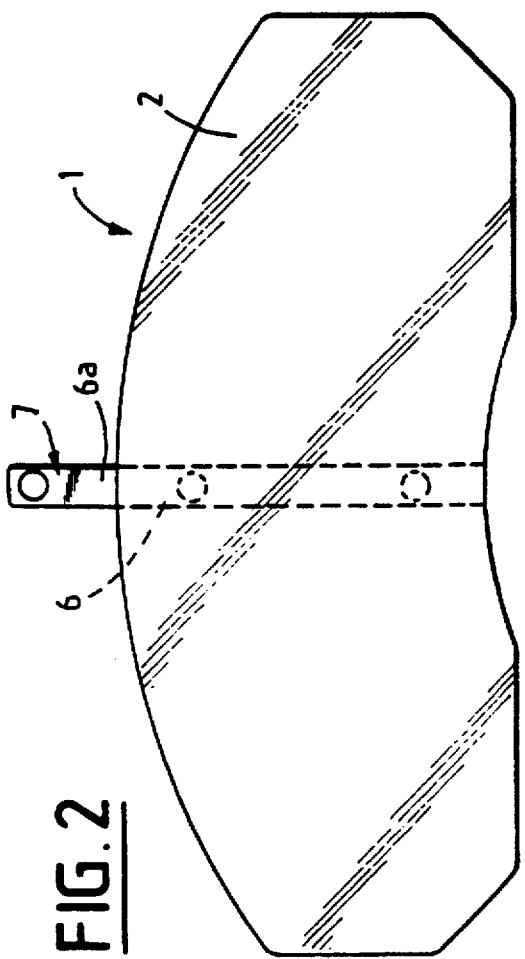
FIG. 2 is a view of the friction face of the brake pad of FIG. 1.
Figure 4:
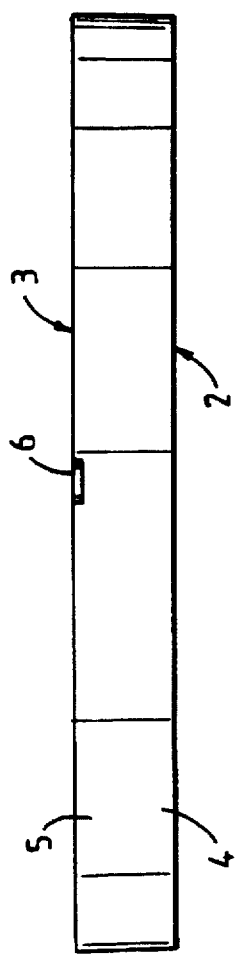
FIG. 4 is a plan view of the FIG. 1 brake pad.

FIG. 1 to 4 show a single-block brake pad 1 made by moulding material in the form of a uniform powder mixture, the pad has at friction front face 2 designed to co-operate with a rotary part forming a portion of a brake, and a rear face 3 co-operating with a caliper.

The front portion 4 of the pad 1 acts as a brake lining that is worn down by the rotary part, while the rear portion 5 acts as a support member co-operating with the caliper to take up the braking torque. A stainless steel insert 6 is secured to the rear portion 5 of the pad 1. The insert 6 has a surface 6a that is visible outside the pad 1 and on which it is possible to engrave indelible information making the pad 1 traceable even in the event of the front portion 4 that forms the brake lining being worn away.

In the embodiment of FIGS. 1 to 4, the insert 6 is in the form of a thin, narrow strip having a portion locating in the rear portion 5 and having its remainder in the form of a tongue 7 that projects upwards in the brake caliper and that enables the brake pad 1 to be extracted when worn. The tongue 7 can be used to carry information enabling the pad to be uniquely identified.

The insert 6 may be flush with the surface of the pad 1 or it may be set into a recess in the pad. What matters is that the insert always has a surface 6a that is visible from the outside of the pad 1.

The insert 6 may be installed during a preforming operation that precedes the final moulding operation, or else during the operation of moulding the lining, or indeed during the final operation of machining the lining.

If it is installed during the preforming operation, the insert may be applied manually on the friction lining preform or on the single-block pad preform, or it may be applied automatically by the piston of the preforming press.

Figure 5:
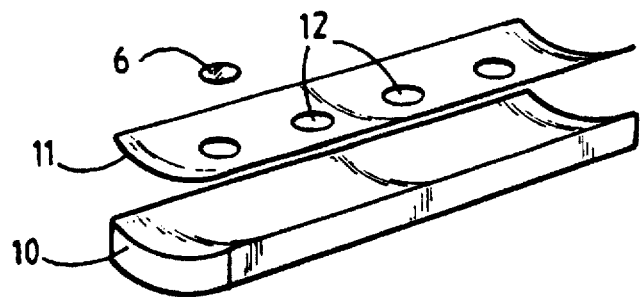
FIG. 5 shows a method of positioning inserts on a trough-shaped preform.
Figure 6:
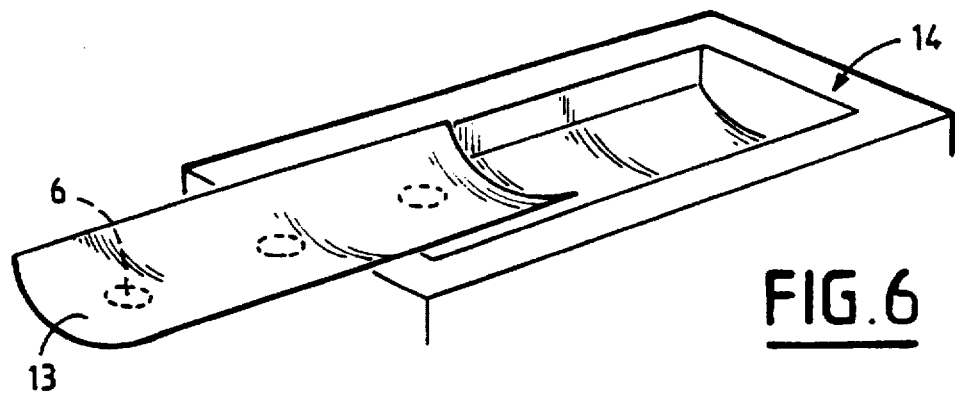
FIG. 6 shows another method of positioning inserts on a friction lining preform.
Figure 7:
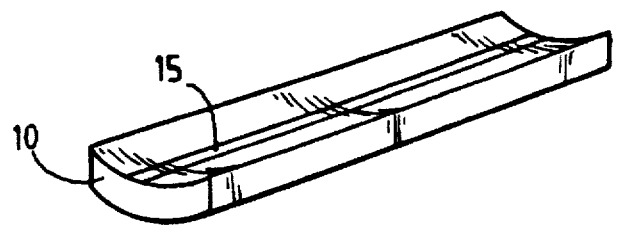
FIG. 7 shows a variant of the FIG. 5 method.

When the preforms 10 are trough-shaped, it is possible to use a mask 11 that is trough-shaped and that has openings 12 for positioning inserts 6 in such a manner that after moulding and cutting into individual linings, each lining has its own insert 6, as can be seen in FIG. 5. The inserts 6 may also be pre-stuck on a sheet 13 that is placed in the preforming mould 14 after the friction substance has been placed therein, as shown in FIG. 6. Instead of using separate inserts 6, it is possible to use a continuous strip 15 that is narrow and thin and that runs along one of the generator lines of the trough-shaped preform 10 (FIG. 7), said strip having the same length as the trough, with the strip 15 being etched in such a manner that after the trough 10 has been moulded and cut up into a plurality of brake linings, each lining carries the necessary information.

When the inserts 6 are installed during moulding of the friction lining preform, it is possible to slide a sheet between the preform and the mould, said sheet having the inserts 6 pre-positioned thereon. When moulding is completed, the sheet is withdrawn and the inserts remain in the lining.

When the brake pad constitutes a single block that is made by moulding a powder mixture of friction material, it is possible to place the insert in the bottom of the mould or on the active face of the moulding piston.

Figure 8:
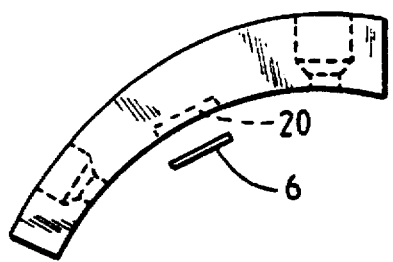
FIGS. 8 and 9 show a method of fixing an insert on a friction lining for a drum brake while said lining is being machined.
Figure 9:
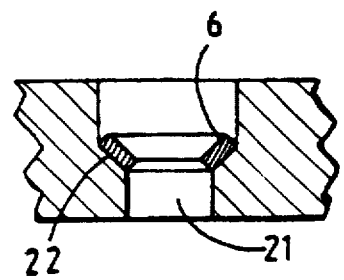

Finally, the insert may be fixed on the friction lining during final machining of the lining. As can be seen in FIG. 8, the insert 6 may be a force-fit in the bottom of a blind hole 20 of dimensions that make it impossible to remove the insert. It is possible to install an insert 6 in the form of a washer in a pre-existing hole 21, the insert being a force-fit therein and coming to rest against a bearing surface 22 for a rivet head for which the hole 21 is, in fact, provided. This embodiment is shown in FIG. 9.

What is claimed is:

1. A brake lining for a vehicle brake, adapted to cooperate with a rotary part of the brake wherein the lining includes a substantially planar friction face and an insert extending away from said friction face, said insert having an identification surface substantially parallel to said friction face, wherein said insert is not oxidizable and withstands temperatures greater than 200° C., said identification surface being externally visible when the lining is installed in the vehicle brake, said identification surface provided with indelible information identifying said lining.

2. A brake lining according to claim 1, wherein said insert is of stainless steel.

3. A brake pad for a vehicle brake, the pad comprising a friction face adapted to cooperate with a rotary part of the brake, and a support portion adapted to cooperate with another brake component for taking up braking torque, the friction face and the support portion being formed together by moulding, and wherein said support portion includes an insert that is not oxidizable and that withstands temperatures greater than 200° C., said insert being provided in the form of a tongue, having an identification surface located remote from said friction face and externally visible when the pad is, installed in the vehicle brake, and wherein said identification surface projects away from and substantially parallel to said friction face and is provided with indelible information identifying said brake pad.

4. A brake lining or brake pad according to claim 3, wherein the insert is of stainless steel.

* * * * *